(No Model.)
E. F. BRADDOCK.
EYEGLASSES.
No. 604,928. Patented May 31, 1898.
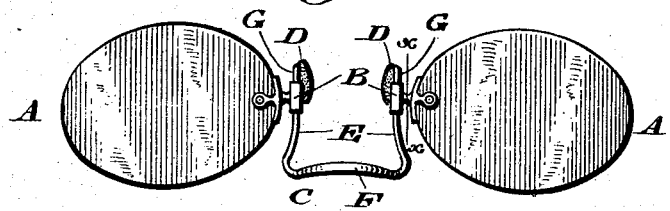
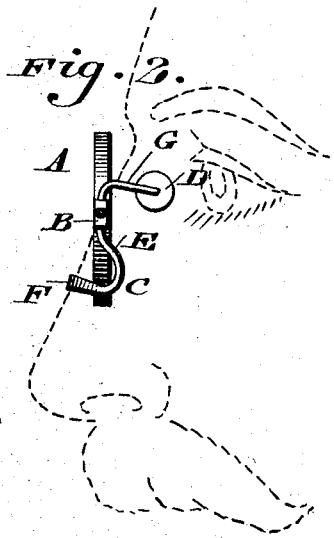
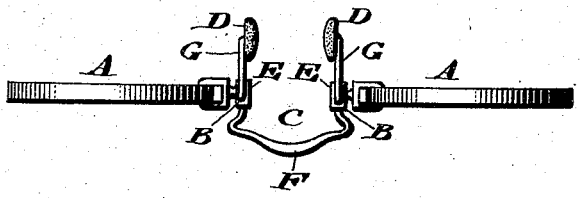

UNITED STATES PATENT OFFICE.

EFFIE FRANCES BRADDOCK, OF PHILADELPHIA, PENNSYLVANIA.

EYEGLASSES.

SPECIFICATION forming part of Letters Patent No. 604,928, dated May 31, 1898.

Application filed September 30, 1897. Serial No. 653,541. (No model.)

*To all whom it may concern:*

Be it known that I, EFFIE FRANCES BRADDOCK, a citizen of the United States, residing in the city and county of Philadelphia, State of Pennsylvania, have invented a new and useful Improvement in Eyeglasses, which improvement is fully set forth in the following specification and accompanying drawings.

My invention consists in providing eyeglasses with nose-clamps proper and means for supporting the lenses thereof in proper position from below and preventing the same from slipping downwardly and turning outwardly, and consequent displacement from the nose, said means consisting of a bridge constructed as will be hereinafter described and adapted to be adjusted to the anatomy of the nose so as to engage therewith and cause the glasses to remain in position should the nose-clamps break or be removed.

Figure 1 represents a front view of eyeglasses embodying my invention. Fig. 2 represents a partial side elevation and partial vertical section thereof on line $x\,x$, Fig. 1. Fig. 3 represents a top or plan view thereof.

Similar letters of reference indicate corresponding parts in the figures.

Referring to the drawings, A designates the lenses of a pair of eyeglasses, and B B the studs attached to the inner ends thereof.

C designates the spring or bridge which connects the lenses, and D designates the nose clamps or guards which with said spring are secured to the studs B.

The spring C consists of a piece of metal or other suitable material bent into somewhat yoke form, comprising the side pieces E and the bottom cross-piece F, said side pieces extending downwardly and outwardly from the studs B, to which their upper ends are secured, and said cross-piece joining the lower ends of said pieces E, said cross-piece being also curved outwardly, so as to accord with the anatomy of the nose of the wearer at the front margin or bridge and adjacent side parts thereof, with which it is adapted to contact, said pieces E being on the sides of the nose, below the studs B, it being also noticed that the spring C depends from said studs.

The operation is as follows: The glasses are adjusted to the nose, whereupon the cross-piece F of the spring rests upon the front margin or bridge of the nose below the studs B, by which provision the glasses are sustained and prevented from either slipping downwardly or overturning outwardly and dropping, whereby they are reliably held on the nose, the convenience and benefit of which are evident.

The side pieces E are shown continuous of or integral with the arms G, which carry the guards D, thus avoiding joints for said pieces and arms and simplifying the construction of parts.

Should it be desired to retain the glasses in position by the pressure of the spring or bridge on the nose, the guards may be dispensed with.

Having thus described my invention, what I claim as new, and desire to secure by Letters Patent, is—

Eyeglasses having nose-clamps proper, and a nose-bridge consisting of downwardly and outwardly projecting side pieces, the latter being adapted to clamp the sides of the nose of the wearer, said side pieces being connected by a cross-piece which is below the nose-clamps proper and is adapted to rest on the bridge of the nose.

EFFIE FRANCES BRADDOCK.

Witnesses:
JOHN A. WIEDERSHEIM,
JAMES BINGHAM.